(12) United States Patent
Bartlett et al.

(10) Patent No.: US 7,728,549 B2
(45) Date of Patent: Jun. 1, 2010

(54) BATTERY PACK INCLUDING AN EMERGENCY BACK-UP BATTERY FOR USE IN MOBILE ELECTRONIC DEVICES

(76) Inventors: Matthew Bartlett, 2513 Valley Farm Rd., Waxhaw, NC (US) 28173; Brad Sherrill, 2800 Laney Rd., Monroe, NC (US) 28112

( * ) Notice: Subject to any disclaimer, the term of this patent is extended or adjusted under 35 U.S.C. 154(b) by 640 days.

(21) Appl. No.: 11/256,532

(22) Filed: Oct. 21, 2005

(65) Prior Publication Data

US 2007/0090791 A1 Apr. 26, 2007

(51) Int. Cl.
*H02J 7/00* (2006.01)
(52) U.S. Cl. .................. 320/107; 320/112; 320/114; 320/132
(58) Field of Classification Search ................. 320/107, 320/112, 114, 117, 132
See application file for complete search history.

(56) References Cited

U.S. PATENT DOCUMENTS

| | | | | |
|---|---|---|---|---|
| 5,652,499 | A | * | 7/1997 | Morita et al. ............... 320/112 |
| 5,705,912 | A | * | 1/1998 | Ichihara ..................... 320/125 |
| 5,783,327 | A | | 7/1998 | Mendolia |
| 5,835,366 | A | | 11/1998 | Pleso et al. |
| 5,963,010 | A | * | 10/1999 | Hayashi et al. ............. 320/106 |
| 6,288,518 | B1 | | 9/2001 | Yang et al. |
| 6,427,072 | B1 | | 7/2002 | Reichelt |
| 6,668,179 | B2 | | 12/2003 | Jiang |
| 6,709,784 | B2 | | 3/2004 | Resch et al. |
| 6,721,580 | B1 | | 4/2004 | Moon |
| 6,734,651 | B2 | | 5/2004 | Cook et al. |
| 6,821,670 | B2 | | 11/2004 | Hsueh |
| 2004/0132501 | A1 | | 7/2004 | Jiang |

OTHER PUBLICATIONS

BatteryUniversity.com, www.batteryuniversity.com, Part One, Basics every battery user should know,Is Lithium-ion the ideal battery? 5 pages, printed Oct. 18, 2005.
BatteryUniversity.com, www.batteryuniversity.com, Part One, Basics every battery user should know,Battery packaging—a look at old and new systems, 5 pages, printed Oct. 18, 2005.
BatteryUniversity.com, www.batteryuniversity.com, Part One, Basics every battery user should know,How to charge—when to charge table, 3 pages, printed Oct. 18, 2005.

(Continued)

*Primary Examiner*—Patrick J Assouad
*Assistant Examiner*—Yalkew Fantu
(74) *Attorney, Agent, or Firm*—Summa, Additon & Ashe, P.A.

(57) ABSTRACT

A rechargeable battery system for a portable electronic device is provided. The system includes a battery pack having a first battery and a second battery. The battery pack is preferably configured to electrically connect one of the first and second batteries to the electronic device in a first position, but requires at least partial detachment from the electronic device and reattachment of the battery pack to the electronic device in a second position, different from the first position, to electrically connect the other of the first and second batteries to the electronic device. The system further includes at least one set of charging terminals on the battery pack for charging the first and second batteries.

20 Claims, 1 Drawing Sheet

OTHER PUBLICATIONS

BatteryUniversity.com, www.batteryuniversity.com, Part One, Basics every battery user should know,the'smart'battery, 6 pages, printed Oct. 18, 2005.

BatteryUniversity.com, www.batteryuniversity.com, Part One, Basics every battery user should know,Do and don't battery table, 3 pages, printed Oct. 18, 2005.

BatteryUniversity.com, www.batteryuniversity.com, Part Two, Getting the most from your batteries,The secrets of battery runtime, 5 pages, printed Oct. 18, 2005.

BatteryUniversity.com, www.batteryuniversity.com, Part Two, Getting the most from your batteries,Non-Correctable Battery Problems, 4 pages, printed Oct. 18, 2005.

BatteryUniversity.com, www.batteryuniversity.com, Part Two, Getting the most from your batteries,How to prolong lithium-based batteries, 4 pages, printed Oct. 18, 2005.

BatteryUniversity.com, www.batteryuniversity.com, Part Two, Getting the most from your batteries,Choosing the right battery for wireless communications, 4 pages, printed Oct. 18, 2005.

BatteryUniversity.com, www.batteryuniversity.com, Part Two, Getting the most from your batteries, Choosing the right battery for portable computing, 4 pages, printed Oct. 18, 2005.

BatteryUniversity.com, www.batteryuniversity.com, Part Two, Getting the most from your batteries,Choosing the right battery for industrial applications, 4 pages, printed Oct. 18, 2005.

BatteryUniversity.com, www.batteryuniversity.com, Part Two, Getting the most from your batteries, The future battery, 3 pages, printed Oct. 18, 2005.

\* cited by examiner

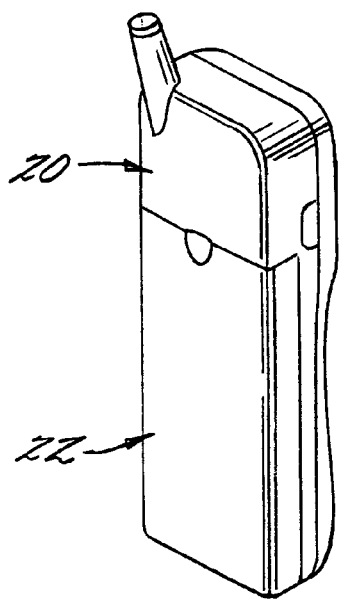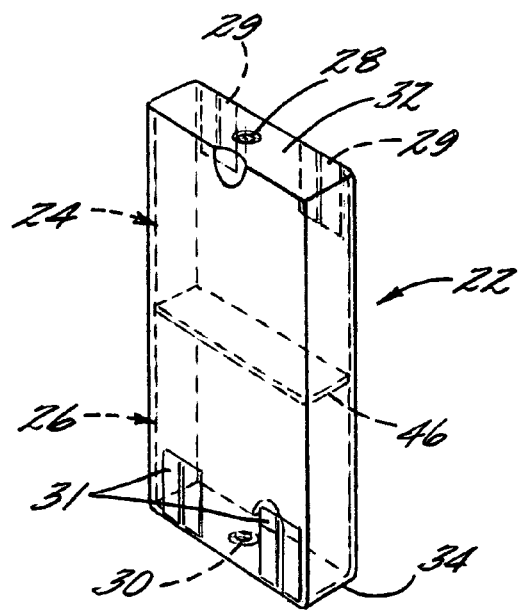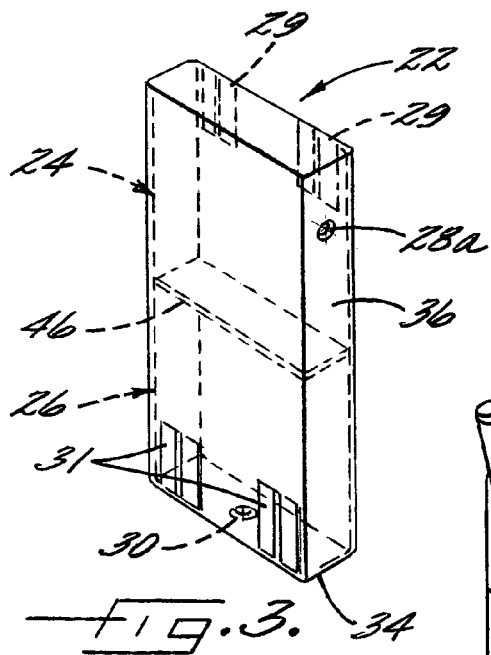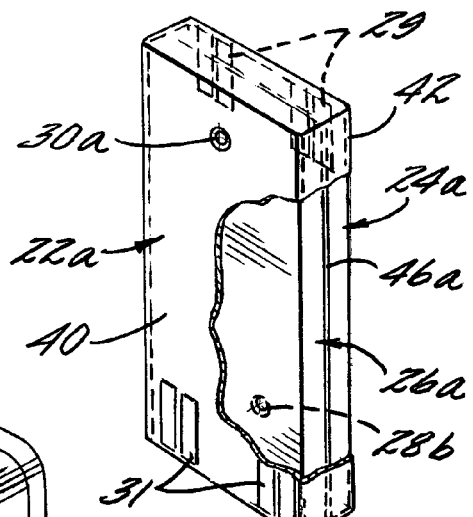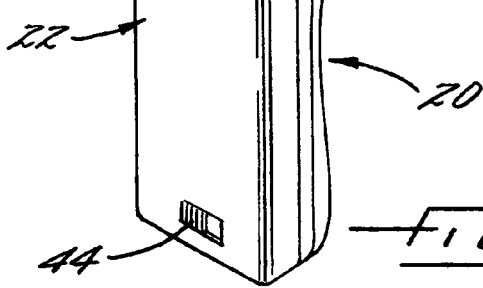

BATTERY PACK INCLUDING AN EMERGENCY BACK-UP BATTERY FOR USE IN MOBILE ELECTRONIC DEVICES

BACKGROUND OF THE INVENTION

The invention relates to the field of portable electronic devices. More particularly, the invention relates to rechargeable batteries for use with portable electronic devices.

Portable electronic devices, such as mobile telephones, personal data assistants (PDAs), laptops, video cameras, mp3 players, digital cameras, beepers, and global positioning devices are becoming ubiquitous in modern society. As these devices become smaller and more portable, users are becoming more reliant on the consistent availability of the devices.

Portable electronic devices, such as those described above, are often powered by batteries having different battery storage capacities. The different battery storage capacities are often dependent on the size of the device and the current state of battery technology. The size of the device is often dependent on consumer demand. As consumers become more reliant on such devices, they often demand smaller, more portable devices. This, in turn, may lead to a demand for smaller batteries. Among the challenges, therefore, for these mobile devices are to manage the battery power efficiently and to extend the battery life as long as possible both in an active mode and in a standby mode.

Most portable devices are presently supplied with relatively good rechargeable batteries with a long usage time (i.e., use in an active mode) and a long operative waiting time (i.e., a standby mode). Battery powered devices can typically include a battery monitor circuit to monitor the level of remaining battery power available for use of the mobile device. A general display of the battery power remaining may be made available upon actuation of an appropriate function key. Alternatively, a battery power monitor may be included on a screen of the device. When the battery power supply level has fallen beneath an absolute minimum limit, or depletion level needed to make or continue an ongoing call, then a special indication or warning is given of this low power disabled condition. Once this disabled condition is reached, it is impossible to use the device, even for emergency use.

Many users, however, run out of battery capacity even with the availability of the above warning systems. To overcome this problem, a user must either carry a spare battery, requiring advance planning, or find a suitable place to charge the battery, which in turn depends on having a battery charger available and being in the vicinity of an electric contact point with suitable voltage. In many situations, it is impractical to carry a spare battery or charger. Moreover, in many situations it will be necessary to re-establish a connection that was interrupted because of deficient battery power more quickly than would be possible if the user had to wait for the battery to recharge.

Previous solutions to the problem of unexpected power loss include "rationing" a part of the battery capacity for an emergency situation. This solution, however, often requires the user to preprogram the device with a list of numbers or activities that may be assessed when battery power is low. This solution does not, therefore, address a situation where different information, such as an unexpected phone number, access to a particular email, or completion of an important phone call, is needed during a period of low battery power.

As discussed above, it is also known to connect an external battery (spare battery) to a portable device that has lost battery power. This spare battery gives the electronic device additional operative time through increased battery capacity. This, too, requires advance planning by the user. Many users do not prepare for the loss of battery power and would not, therefore, have a spare battery available when loss of power occurs.

SUMMARY OF THE INVENTION

Accordingly, in one aspect the invention is a rechargeable battery system for a portable electronic device. The system includes a battery pack having a first battery and a second battery. The battery pack is can be configured to electrically connect one of the first and second batteries to the electronic device in a first position, but can require at least partial detachment from the electronic device and reattachment of the battery pack to the electronic device in a second position, different from the first position, to electrically connect the other of the first and second batteries to the electronic device. The system further includes at least one set of charging terminals on the battery pack for charging the first and second batteries.

In another aspect, the invention is a method of extending the life of a portable electronic device. The method includes attaching a rechargeable battery pack including a first battery and a second battery to the electronic device in a first position to electrically connect at least one of the first or second batteries to the electronic device to power the device. The method further includes at least partially detaching the battery pack from the electronic device to electronically disconnect the at least one of the first and second batteries, and reattaching the battery pack in a different position to electronically connect the other of the first and second batteries.

In yet another aspect, the invention is a battery pack including a first rechargeable battery, a second rechargeable battery, a nonconductive divider between the first rechargeable battery and the second rechargeable battery, and at least one set of terminals for providing a charge to the first rechargeable battery and the second rechargeable battery. In an exemplary embodiment, the second rechargeable battery has a shorter use time than the first rechargeable battery.

In another aspect, the invention is a rechargeable battery system for a portable electronic device including a battery pack having a first battery, a second battery, and a switching device. The battery pack is configured to electrically connect one of the first and second batteries to the electronic device, but requires a user to toggle the switching device to electrically disconnect the one of the first and second batteries from the electronic device and electrically connect the other of the first and second batteries to the electronic device. The system further includes at least one set of charging terminals on the battery pack for charging the first and second batteries.

In another aspect, a method of extending the use time of a portable electronic device includes attaching a rechargeable battery pack including a first battery and a second battery to the electronic device in a position to electrically connect at least one of the first or second batteries to the electronic device to power the device. The method further includes toggling a switching device on the battery pack to electrically disconnect the at least one of the first and second batteries and electrically connect the other of the first and second batteries to the electronic device.

The foregoing, as well as other objectives and advantages of the invention and the manner in which the same are accomplished, is further discussed within the following detailed description and its accompanying drawings.

BRIEF DESCRIPTION OF THE DRAWINGS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements.

FIG. 1 is a representative electronic device powered by a battery system in accordance with the present invention.

FIG. 2 is a representative embodiment of a battery system in accordance with the present invention.

FIG. 3 is a different representative embodiment of a battery system in accordance with the present invention.

FIG. 4 is another representative embodiment of a battery system in accordance with the present invention.

FIG. 5 is a representative electronic device powered by another embodiment of a battery system in accordance with the present invention.

DETAILED DESCRIPTION

The invention relates to rechargeable batteries and a method of extending the use time of a portable electronic device powered by rechargeable batteries.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Additionally, and for the sake of clarity, the invention will be described with reference to mobile telephones. It will be understood, however, that the invention is not limited to use with mobile telephones, but may be used in conjunction with any portable electronic device that is capable of being powered by rechargeable batteries. For example, exemplary devices in which the invention may be used include mobile telephones, beepers, PDAs, laptops, video cameras, mp3 players, digital cameras, global positioning systems, and other portable electronic devices known in the art as being powered by rechargeable batteries.

Batteries contemplated as useful in the present invention include rechargeable batteries having electrochemical systems known in the art. Electrochemical battery systems contemplated as useful include, but are not limited to, one or more of nickel based, such as nickel-cadmium or nickel-metal-hydride; lithium ion; lithium polymer; and lead-acid electrochemical systems. Other electrochemical systems known in the art as useful in rechargeable batteries are also contemplated as useful in conjunction with the present invention.

With reference to FIG. 1, the invention, in one aspect, is a rechargeable battery system for an electronic device 20. The system includes a battery pack 22, depicted in FIGS. 2-4, having a first battery 24 and a second battery 26. The battery pack 22 is preferably configured to electrically connect one of the first and second batteries 24, 26 to the electronic device 20 in a first position, but requires at least partial detachment from the electronic device 20 and reattachment of the battery pack 22 to the electronic device 20 in a second position, different from the first position, to electrically connect the other of the first and second batteries 24, 26 to the electronic device 20.

The system further includes at least one set of charging terminals 28 on the battery pack 22 for charging the first and second batteries 24, 26. In an exemplary embodiment, the first battery 24 and the second battery 26 are permanently encased in the battery pack 22.

The battery pack 22 also can include at least one set of electric contacts 29. In an exemplary embodiment, the battery pack 22 includes one set of electric contacts 29, 31 for each battery 24, 26 included in the battery pack 22. In exemplary embodiments, the electric contacts 29, 31 are positioned on the battery pack 22 such that at least one set of the electric contacts 29, 31 will establish at least partial contact with electric contacts positioned on the electronic device (not shown).

In one embodiment, the invention includes a second set of charging terminals 30. In embodiments that include the second set of charging terminals 30, the first set of charging terminals 28 may charge one of the first and second batteries 24, 26 and the second set of charging terminals 30 may charge the other of the first and second batteries 24, 26.

With respect to FIG. 2, in an exemplary embodiment including two sets of charging terminals 28, 30 the battery pack 22 includes at least two opposing edges 32, 34 and the first set of charging terminals 28 and the second set of charging terminals 30 are positioned such that only one set of charging terminals 28, 30 are on each of the opposing edges 32, 34 of the battery pack 22.

With respect to FIG. 3, in another exemplary embodiment including two sets of charging terminals 28a, 30 the battery pack 22 includes a first edge 36 adjacent a second edge 34 and the first set of charging terminals 28a and the second set of charging terminals 30 are positioned such that only one set of charging terminals 28a, 30 are on each of the first and second adjacent edges 34, 36 of the battery pack 22.

With respect to FIG. 4, in yet another exemplary embodiment including two sets of charging terminals 28b, 30a the battery pack 22a includes a first opposing side 40 and a second opposing side 42 and the first set of charging terminals 28a and the second set of charging terminals 30a are positioned such that only one set of the first and second charging terminals 28b, 30a are on each of the first and second opposing sides 40, 42 of the battery pack 22a.

It will be recognized by one having ordinary skill in the art that the placement of the charging terminals 28, 30 in the Figures is intended to be representative. The placement of the charging terminals 28, 30 in particular locations on the battery pack 22 in the Figures is representative of the relative positions of the edges and/or sides on which the charging terminals 28, 30 are located, not the particular position of the charging terminals 28,30 on the edge and/or side of the battery pack 22.

Similarly, it will be recognized by one having ordinary skill in the art that charging terminals 28, 30 may have a different configuration than that depicted in the Figures. Charging terminals having configurations known in the art are contemplated as being exemplary for use in the present invention. The depicted circular charging terminals are representative of all configurations of charging terminals known in the art as useful for charging rechargeable batteries.

With respect to FIG. 5, in another aspect the invention is a rechargeable battery system for an electronic device 20 including a battery pack 22, as depicted in FIGS. 2-4, having a first battery 24, a second battery 26, and further including a switching device 44, as depicted in FIG. 5. The battery pack 22 is configured to electrically connect one of the first and second batteries 24, 26 to the electronic device 20, but requires a user to toggle the switching device 44 to electrically disconnect the one of the first and second batteries 24, 26 from the electronic device and electrically connect the other of the first and second batteries 24, 26 to the electronic device. The system further includes at least a first set of charging terminals 28 on the battery pack for charging the first and second batteries 24, 26.

In another aspect, the invention is a battery pack 22, such as the battery pack 22 depicted in FIG. 2. The battery pack 22 includes at least a first battery 24 and a second battery 26. The pack 22 preferably also includes a nonconductive divider 46 between the first battery 24 and the second battery 26. The non-conductive divider 46 may be a casing on one or both of the first and second batteries 24, 26. Exemplary materials for use as a nonconductive divider 46 may be selected from materials known in the art as being non-conductive. An exemplary nonconductive divider 46 can be a polymer layer.

Additionally, the nonconductive divider may be positioned between each of two or more batteries enclosed in a single housing, or each battery may be enclosed in a separate housing and then enclosed together in a single housing, with the separate housings forming the nonconductive dividers 46*a* (i.e., FIG. 4).

The battery pack 22 also can include at least a first set of charging terminals 28 for providing a charge to the first rechargeable battery 24 and the second rechargeable battery 26. In an exemplary embodiment, the second rechargeable battery 26 has a shorter use time than the first rechargeable battery 24.

In an exemplary embodiment, the first rechargeable battery 24 and the second rechargeable battery 26 are encased in a single housing to form the battery pack 22.

As will be recognized by one having ordinary skill in the art, the battery packs depicted in the figures are representative of a configuration of a battery pack to fit a particular electronic device. Battery packs configured to power portable electronic devices such as those described above are contemplated as useful in the present invention. Accordingly, the shape and size of contemplated battery packs are not limited by the Figures.

Additionally, those having ordinary skill in the art will recognize that the first and second batteries may be of the same size. Alternatively, one of the first and second batteries may be larger than the other of the first and second batteries.

Those having ordinary skill in the art will also recognize the relative positions of the batteries as depicted in the Figures is representative of the positions of the first and second batteries in various battery packs capable of powering portable electronic devices. The first and second batteries may be positioned side-by-side, top-to-bottom, front-to-back, and in other configurations recognized by those having ordinary skill in the art. Additionally, the rechargeable batteries included in the present battery packs may include the same or different electrochemical systems.

In another embodiment, battery packs formed in accordance with the present invention may include more than two rechargeable batteries. The rechargeable batteries within the battery pack may be of the same or different sizes. They may also be positioned relative to one another as described above with reference to a battery pack including two batteries. Additionally, the rechargeable batteries included in the present battery packs may include the same or different electrochemical systems.

The battery packs of the present invention provide a back-up power supply (i.e., the second battery) for use when the primary battery (i.e., the first battery) has lost power. The back-up power supply is not limited to use for a particular list of preprogrammed numbers or actions. Rather, the back-up power supply allows the user time to retrieve information from the portable electronic device, finish a call, or take other necessary actions that may not be contemplated in advance of their need. Because such actions may not be contemplated in advance of their need, a user is unlikely to have prepared or preprogrammed the device to include those actions if the previously described battery systems are employed.

Additionally, the battery packs of the present invention do not require a user to carry a separate power device, such as an additional, separate battery or a battery charger, in preparation for loss of battery power. The present invention provides battery power for a portable electronic device in the event of unexpected power loss in the primary battery.

In another aspect, the invention is a method of extending the life of a portable electronic device. The method includes attaching a rechargeable battery pack including a first battery and a second battery to the electronic device in a first position to electrically connect at least one of the first or second batteries to the electronic device to power the device. The method further includes at least partially detaching the battery pack from the electronic device to electronically disconnect the at least one of the first and second batteries, and reattaching the battery pack in a different position to electronically connect the other of the first and second batteries.

In one embodiment, the step of partially detaching the battery pack can include completely detaching the battery pack before the step of reattaching the battery pack.

The step of reattaching the battery pack in a second position different from the first position preferably includes rotating the battery pack approximately 180° about an axis substantially perpendicular to the electronic device after the detaching step. In another embodiment, the step of reattaching the battery pack in a second position different from the first position includes rotating the battery pack approximately 90° about an axis substantially perpendicular to the electronic device after the detaching step. In a different embodiment, the step of reattaching the battery pack in a second position different from the first position includes rotating the battery pack approximately 90° about an axis substantially parallel to the electronic device after the detaching step. In yet another embodiment, the step of reattaching the battery pack in a second position different from the first position includes rotating the battery pack approximately 180° about an axis substantially parallel to the electronic device after the detaching step.

It will be understood by persons having ordinary skill in the art that the battery pack may be rotated in any manner appropriate to provide an electrical connection between the electronic device and one of the first and second batteries located in the battery pack. Stated differently, the battery pack may be rotated about both a parallel axis and a perpendicular axis to provide the desired electrical connection. Additionally, those having ordinary skill in the art will recognize that the electrical contacts may be on the same or different sides of the battery pack. The positions of the electrical contacts depicted in the Figures are representative only, and should not be construed as limiting the positions of the electrical contacts.

In another aspect, a method of extending the use time of a portable electronic device includes attaching a rechargeable battery pack including a first battery and a second battery to the electronic device in a position to electrically connect at least one of the first or second batteries to the electronic device to power the device. The method further includes toggling a switching device on the battery pack to electrically disconnect the at least one of the first and second batteries and electrically connect the other of the first and second batteries to the electronic device.

As used herein, the term "toggle" includes other methods of activating a switching device including, but not limited to, pushing, flipping, sliding, etc. The term "switching device" encompasses devices that enable a user to transfer the electrical connection between a first battery to a second battery without disconnecting the battery pack from the electronic device. The term "switching device" may also include a button or other devices known in the art to be capable of functioning as described above.

It will be recognized by those having ordinary skill in the art that the switching step may also include partial detachment of the first battery prior to attachment of the second battery. Stated differently, if the first battery is in electrical contact with the portable device to provide power to the portable electronic device and a user toggles the switching device, the electrical contact between the first battery and the portable electronic device may be broken, resulting in partial detachment of the battery pack from the portable electronic device. Similarly, the second battery will then be electrically connected to the portable electronic device after the switching device is toggled to thereby provide power to the portable electronic device.

The breaking of the electrical contact between the first battery and the portable electronic device, therefore, serves to provide a partial detachment. The forming of the electrical contact between the second battery and the portable electronic device serves to provide attachment of the second battery to the electronic device.

In the specification, drawings, and examples, there have been disclosed typical embodiments of the invention and, although specific terms have been employed, they have been used in a generic and descriptive sense only and not for purposes of limitation, the scope of the invention being set forth in the following claims.

The invention claimed is:

1. A rechargeable battery system for an electronic device, said system comprising: a battery pack having first and second opposing sides; a first battery and a second battery, wherein both batteries are positioned within said battery pack between said opposing sides; a respective electric contact on each opposing side of said battery pack, wherein one of said electric contacts forms an electrical connection between one of said batteries and the electronic device; and wherein said battery pack is rotatable about an axis such that the other electric contact electrically connects the other battery to the electronic device; and reattach the battery pack in a different position comprises rotating the battery pack approximately 180° about an axis substantially parallel to the electronic device after the detaching the battery pack; and at least one set of charging terminals on said battery pack for charging said first battery and said second battery.

2. A rechargeable battery system according to claim 1, wherein said first battery and said second battery are permanently encased in said battery pack.

3. A rechargeable battery system according to claim 1, comprising a first set of terminals for charging said first battery and a second set of terminals for charging said second battery.

4. A rechargeable battery system according to claim 3, wherein the battery pack includes at least two opposing edges and wherein said first set of terminals and said second set of terminals are situated on said opposing edges of said battery pack.

5. A rechargeable battery system according to claim 3, wherein the battery pack includes at least two adjacent edges and wherein said first set of terminals and said second set of terminals are situated on said adjacent edges of said battery pack.

6. A rechargeable battery system according to claim 3, wherein the battery pack includes at least two opposing sides and wherein said first set of terminals and said second set of terminals are situated on said opposing sides of said battery pack.

7. A rechargeable battery system according to claim 1, wherein said second battery has a shorter lifetime than said first battery.

8. A rechargeable battery system according to claim 1, wherein said battery pack may be used to power one or more of laptops, cellular phones, video cameras, mp3 players, digital cameras, beepers, global positioning systems, and PDAs.

9. A rechargeable battery system according to claim 1, wherein said first and second batteries comprise the same chemical systems.

10. A rechargeable battery system according to claim 1, wherein said first and second batteries comprise different chemical systems.

11. A method of extending the life of a portable electronic device comprising: attaching a rechargeable battery pack including a first battery and a second battery to the device in a first position to electrically connect at least one of said first or second batteries to the electronic device to power the device; at least partially detaching the battery pack from the electronic device; rotating the battery pack about an axis to electronically disconnect the at least one of the first and second batteries; and reattaching the battery pack in a position different from said first position to electronically connect the other of the first and second batteries; and wherein the step of reattaching the battery pack in a different position comprises rotating the battery pack approximately 180° about an axis substantially parallel to the electronic device after the detaching step.

12. A method according to claim 11, wherein the step of detaching the battery pack comprises completely detaching the battery pack.

13. A method according to claim 11, wherein the step of reattaching the battery pack in a different position comprises rotating the battery pack approximately 180° about an axis substantially perpendicular to the electronic device after the detaching step.

14. A method according to claim 11, wherein the step of reattaching the battery pack in a different position comprises rotating the battery pack approximately 90° about an axis substantially perpendicular to the electronic device after the detaching step.

15. A method according to claim 11, wherein the step of reattaching the battery pack in a different position comprises rotating the battery pack approximately 90° about an axis substantially parallel to the electronic device after the detaching step.

16. A battery pack comprising: first and second rechargeable batteries positioned between opposing sides of the battery pack; a nonconductive divider between said first rechargeable battery and said second rechargeable battery; a respective electric contact on each opposing side of said battery pack, wherein one of said electric contacts forms an electrical connection between one of said batteries and the electronic device, and wherein the battery pack is rotatable about an axis such that the other electric contact electrically connects the other battery to the electronic device; and reattach the battery pack in a different position comprises rotating the battery pack approximately 180° about an axis substantially parallel to the electronic device after detaching the battery pack; and at least one set of terminals for providing a charge to said first rechargeable battery and said second rechargeable battery; and wherein said second rechargeable battery has a shorter use time than said first rechargeable battery.

17. A battery pack according to claim 16 wherein said first rechargeable battery and said second rechargeable battery are encased in a single housing to form said battery pack.

18. A battery pack according to claim 16 wherein said first rechargeable battery and said second rechargeable battery comprise the same chemical systems.

19. A battery pack according to claim 16, wherein said first rechargeable battery and said second rechargeable battery comprise different chemical systems.

20. A battery pack according to claim 16, further comprising a switching device to electrically disconnect one of the first and second batteries from a portable electronic device and electrically connect the other of the first and second batteries to the portable device.

* * * * *